United States Patent [19]

Smay et al.

[11] Patent Number: 4,837,699
[45] Date of Patent: Jun. 6, 1989

[54] METHOD FOR CONTROLLING THE SPIN AXIS ATTITUDE OF A SPINNING SPACECRAFT

[75] Inventors: John W. Smay, Torrance; William F. Hummel, Jr., Los Angeles; Carl L. Chen, Rolling Hills Estate; Loren I. Slafer, Los Angeles, all of Calif.

[73] Assignee: Hughes Aircraft Company, Los Angeles, Calif.

[21] Appl. No.: 214,789

[22] Filed: Jul. 5, 1988

Related U.S. Application Data

[63] Continuation of Ser. No. 756,880, Jul. 18, 1985, abandoned.

[51] Int. Cl.⁴ .................... B64G 1/26; G06F 15/50
[52] U.S. Cl. .................................. 364/434; 364/459; 244/169
[58] Field of Search ............... 364/434, 455, 459; 244/164, 169, 171; 250/372, 352

[56] References Cited

U.S. PATENT DOCUMENTS

| | | | |
|---|---|---|---|
| 3,907,226 | 9/1975 | Neufeld et al. | 244/169 |
| 3,937,423 | 2/1976 | Johansen | 244/169 |
| 3,944,172 | 3/1976 | Becker | 364/434 |
| 3,984,071 | 10/1976 | Fleming | 364/434 |
| 3,996,804 | 12/1976 | Neufeld | 244/171 |
| 4,062,509 | 12/1977 | Muhlfelder et al. | 244/166 |
| 4,071,211 | 1/1978 | Muhlfelder et al. | 244/165 |
| 4,084,772 | 4/1978 | Muhlfelder | 244/165 |
| 4,084,773 | 4/1978 | Schmidt, Jr. et al. | 244/166 |
| 4,288,051 | 9/1981 | Göschel | 244/171 X |
| 4,358,076 | 11/1982 | Lange et al. | 244/164 |
| 4,567,564 | 1/1986 | Bittner et al. | 364/434 |
| 4,628,206 | 12/1986 | Astheimer | 250/372 |

Primary Examiner—Parshotam S. Lall
Assistant Examiner—Thomas G. Black
Attorney, Agent, or Firm—S. M. Mitchell; M. J. Meltzer; A. W. Karambelas

[57] ABSTRACT

A system located on board a geosynchronous satellite for detecting spin axis precession and developing thruster control signals for restoring the spin axis to the desired attitude. Fuel economy is enhanced by performing the major attitude correction at a time when the fuel expended contributes to that required for orbit inclination control.

4 Claims, 13 Drawing Sheets

FIG 8a
(APPENDIX III)

FIG. 8b (APPENDIX III)

FIG. 8c (APPENDIX III)

FIG. 8d
(APPENDIX III)

FIG. 8e
(APPENDIX III)

FROM FIG. 8e

SAC MANEUVER MODES

IAT: UC = U
 VC = V
 MODE = ETF

ETF: UC = U IF |U| > UO
 VC = V IF |V| > VO

FTF: AT DESCENDING NODE (N1 OR N2 NONZERO)
 VC = V−VA+δ•SP, UC = U IF |U| > UO
 ELSE IF SIDTIM > MO
  IF |V| > VB DO FIXED TRIM
 ELSE (0 < SIDTIM < MO)
  IF SP•(V−VA) > 0, DO FIXED TRIM
 FIXED TRIM: VC = −SP•δ
  NV = 1

ALL CORRECTIONS EXCEPT FIXED TRIM CALCULATE PULSE COUNT AND TRUE CORRECTION:
 NU = INT (KN•ABS(UC)+0.4)
 NV = INT (KN•ABS(VC)+0.4)
 UC = −SGN(UC)•δ•NU
 VC = −SGN(VC)•δ•NV

UC AND VC = 0 ? — YES →

NO ↓

STATE ESIMATOR CORRECTION

$\hat{\phi}_N = \hat{\phi}_N + UC \cdot COST(N) + VC \cdot SINT(N)$ $\hat{\psi}_N = \hat{\psi}_N - UC \cdot SINT(N) + VC \cdot COST(N)$

U = U + UC , V = V + VC

SET MANEUVER WAITING

→ EXIT SAC

FIG. 8f
(APPENDIX III)

NOMENCLATURE

| | |
|---|---|
| CT | CURRENT SAMPLE |
| E | ESTIMATOR ERROR |
| ECH | VALID SELECTED EARTH CHORD |
| ECLEND | ECLIPSE END ORBITAL ANGLE |
| ECLSTR | ECLIPSE START ORBITAL ANGLE |
| ECP | EARTH CHORD PROCESSOR |
| ETF | ERROR THRESHOLD FIRING |
| FTF | FIXED TIME FIRING |
| IAT | IMMEDIATE ATTITUDE TRIM |
| $K_\phi$ | ROLL GAIN |
| $K_\psi$ | YAW GAIN |
| $K_b$ | SENSOR BAIS GAIN |
| $K_N$ | NUMBER OF PULSES PER DEGREE |
| $K_P$ | A CONSTANT = 0.0436332 |
| $K_Z$ | CONSTANT = +1.24 FOR SOUTH SENSOR<br>−1.24 FOR NORTH SENSOR |
| MAX | REQUIRED NUMBER OF SELECTED EARTH CHORDS |
| N | ORBITAL ANGLE |
| N1 | DESCENDING NODE FLAG |
| N2 | FIRST INTERVAL AFTER DESCENDING NODE |
| $\Delta P$ | PRECESSION PER 10 MIN |
| PPM | PLATFORM POINTING MODE |
| QAT | QUICK ROLL ESTIMATE AND ATTITUDE TRIM |
| RTI | REAL TIME INTERRUPT |
| SID | 336576 SEC TIMER (SIDTIM/256) |
| SIDTIM | SIDEREAL CLOCK (86,164.080 SEC) |
| SP | SIGN OF $\Delta P$ |
| SPIN | SPIN RATE |
| TCP | THRUSTER COMMAND PROCESSOR |
| TIM | 600 SEC TIMER |
| U, V | SUN FRAME ATTITUDES |
| $Z_{AVG}$ | AVERAGE EARTH CHORD |
| $Z_{REF}$ | REFERENCED EARTH CHORD = 13.6° |
| $Z_b$ | COMMANDED AVERAGE EARTH CHORD BIAS |
| $\alpha, \beta$ | COMMAND BIASES |
| $\delta$ | DEGREE PER PULSE |
| $\hat{\phi}$ | ROLL ESTIMATE |
| $\hat{\psi}$ | YAW ESTIMATE |
| $\hat{b}$ | SENSOR BIAS ESTIMATE |
| SINT(N), COST(N) | SINE/COSINE LOOKUP TABLE, INDEXED BY N |
| ZMOON | 0.0° IF DISABLED/NO MOON<br>0.4° IF ENABLED AND MOON OCCURS |

FIG. 8g (APPENDIX III)

| TCP COMMANDS |
|---|
| SELECTED AXIAL THRUSTER FIRED (NU,NV) TIMES NR SPIN PERIODS APART FOR 48/96MS CENTERED AT POINT (CU,CV) DEGREES AFTER PSI SUN PULSE CENTROID ANGLES CU,CV |

|  | UC > 0 | UC < 0 | VC > 0 | VC < 0 |
|---|---|---|---|---|
| A X 1 | 85 | 265 | 175 | 355 |
| A X 2 | 265 | 85 | 355 | 175 |

FIG. 8h
(APPENDIX III)

METHOD FOR CONTROLLING THE SPIN AXIS ATTITUDE OF A SPINNING SPACECRAFT

This application is a continuation of application Ser. No. 756,880, filed July 18, 1985, now abandoned.

BACKGROUND OF THE INVENTION

1. Field of the Invention

This invention relates to attitude control systems for spacecraft and, more particularly, to such control systems which can be self-contained on a satellite in geosynchronous or other type of orbit.

2. Description of the Prior Art

In systems employing geostationary spinning satellites, as perhaps with certain other earth satellite systems, it becomes necessary from time to time to determine the spin axis attitude and to execute attitude trim maneuvers. These maneuvers are needed in order to compensate for the spin axis precession which is caused by solar torque.

In predecessor systems, such attitude trim maneuvers have been commanded from ground control stations. In such systems, data which was pertinent to the determination of satellite spin axis attitude was collected by onboard sensors and telemetered to the controlling ground station. There the data was processed to determine the appropriate attitude trim corrections. These were then transmitted to the satellite as command signals to perform the necessary attitude trim maneuvers. This performance of attitude trim correction in real time under ground control requires an operator in the control loop, is subject to anomalies from operator error, transmitted signal interference and the like, and imposes an operational burden on ground control systems. It would be desirable, therefore, to have the required attitude trim maneuvers determined and controlled by systems which are entirely self-contained on the satellite.

SUMMARY OF THE INVENTION

In brief, arrangements in accordance with the present invention comprise spinning earth sensors and an onboard state estimator for attitude determination, plus thruster firing control logic to automatically perform attitude correction. In accordance with a particular feature of the present invention, special control logic is utilized to combine attitude control functions for the optimization of fuel usage.

For its various trajectory control functions, the satellite is provided with both axial and radial jets, or thrusters. The axial thrusters, normally two in number, for redundancy, are directed parallel to the spin axis of the satellite and on opposite sides thereof. The radial thrusters, also normally two in number for redundancy, are mounted along a radius of the satellite. On a spinning satellite, the necessary thrusting maneuvers can be performed with only two jets, one axial jet which is displaced from the spin axis and one radial jet. For north-south station keeping, the axial jet is operated continuously. For east-west station keeping, the radial jet is pulsed. For precession maneuvers and nutation control, the axial jet is operated in a pulsed mode. If more than one axial or radial jet is provided, the pulses are directed to a selected one of the jets.

The orientation of the satellite at all points in its orbit should be such that its spin axis is normal to its orbital plane which intersects the center of the earth. A pair of earth sensors are mounted within the satellite to view the earth periodically during satellite rotation through a window in the side of the satellite. The diametral plane of the spinning satellite should coincide with the satellite's orbital plane. However, as the satellite spin axis precesses so that it is no longer normal to the orbital plane and the diametral plane of the satellite deviates from the orbital plane, the view of the earth detected by one of the sensors departs from coincidence with that detected by the other sensor.

For example, as the diametral plane of the satellite dips below the center of the earth, the chord of the earth which is detected by the north earth sensor as its field of view sweeps the earth will become larger while the chord of the earth sensed by the south earth sensor as its field of view sweeps the earth becomes smaller. On the opposite side of the earth, 180° around the satellite orbit, the opposite situation will obtain: the chord sensed by the south earth sensor will be larger than the chord sensed by the north earth sensor. The difference in sensed chord length from a reference value (normally 13.4° for a sensor cant angle of 5.5° from the spin plane) is used as a measure of satellite roll angle. This difference value is taken from a selected one of the two earth sensors, either north or south depending on which is free of sun interference.

As an alternative, the difference in chord length between the two sensor measurements is a measure of the earth aspect angle and may be used as a measurement of satellite roll angle.

The three-state estimator onboard the satellite estimates the roll, yaw, and earth sensor bias using earth horizon sensor measurements. The earth sensor provides the satellite roll angle measurements while the earth orbit kinematic coupling gives the satellite yaw angle information. Following a determination of the spin-axis attitude and the attitude trim maneuvers which are required, appropriate signals are generated to fire the thrusters at selected points and intervals to achieve the desired attitude corrections. In accordance with an aspect of the invention, the timing of thruster firing is coordinated with orbital position for more efficient overall fuel usage. If, however, it is determined that the precession errors exceed a preset threshold, the thrusters are pulsed to reduce those errors to the threshold range.

BRIEF DESCRIPTION OF THE DRAWING

A better understanding of the present invention may be had from a consideration of the following detailed description, taken in conjunction with the accompanying drawing in which.

DESCRIPTION OF THE PREFERRED EMBODIMENT

The present invention has been developed for the Intelsat VI satellite and the preferred embodiment will be described in the context of that spacecraft. However, this is not to be taken as limiting the scope of the invention, which may have application to other spacecraft operating under other conditions and orbits.

Figure 1:
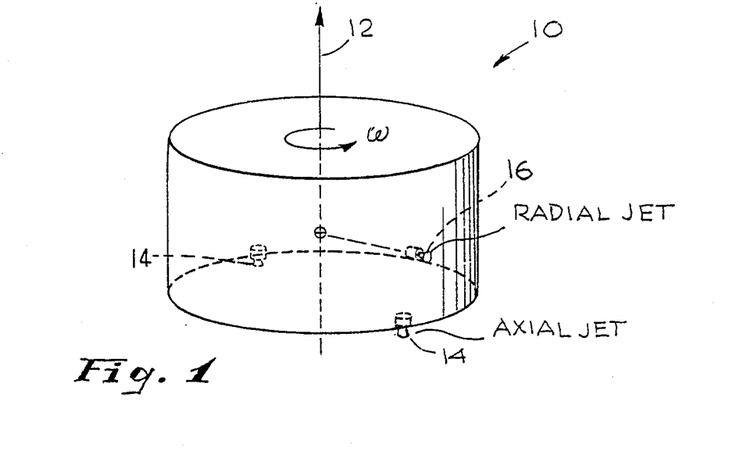
FIG. 1 is a schematic representation of a spinning satellite which may be controlled by the present invention.

Referring to FIG. 1, a satellite 10 is represented schematically, spinning about a longitudinal spin axis 12. The satellite 10 is indicated as equipped with an axial jet or thruster 14, displaced from the spin axis 12, and a radial jet or thruster 16. The axial jet 14 may be one of a pair of thrusters displaced on opposite sides of the spin axis 12. For spin axis attitude correction, only one thruster of an axial pair is pulsed at a time.

Figure 2:
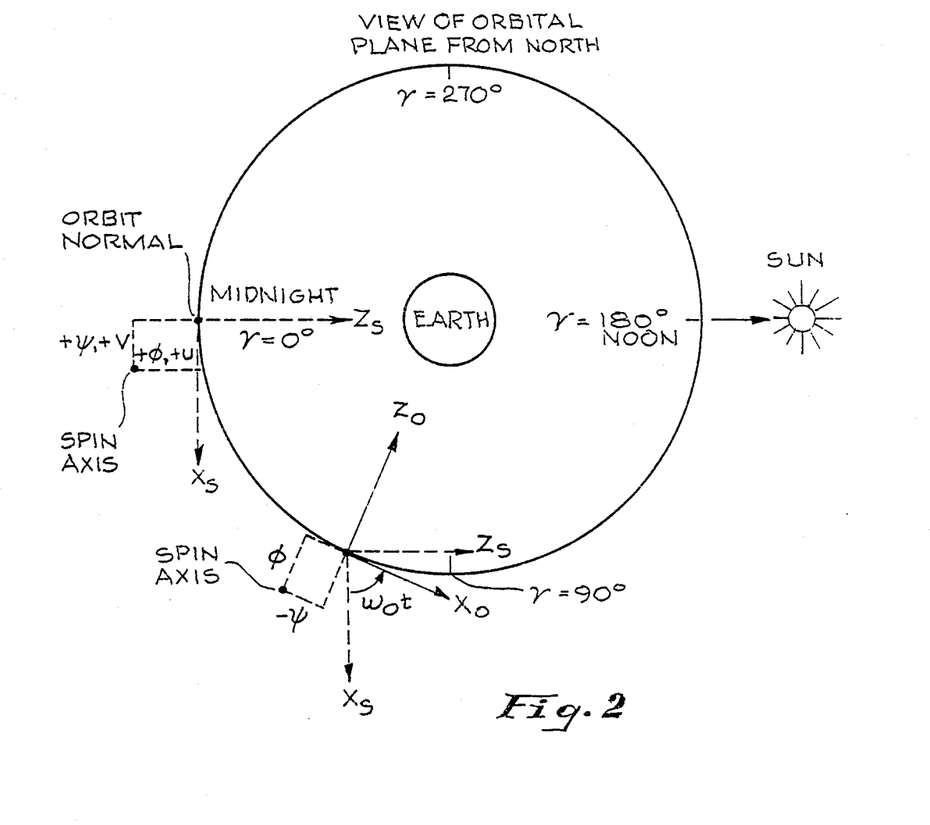
FIG. 2 is an illustrative view indicating the frames of reference of the satellite relative to the earth and to the sun.

FIG. 2 shows the two coordinate frames used in the analysis. The orbit reference frame ($X_0$, $Y_0$, $Z_0$) is oriented as follows: The orbit $X_0$-axis is in the the direction of flight; the orbit $Y_0$-axis is normal to the orbital plane; and the orbit $Z_0$-axis is pointed toward the earth along the radius vector from the satellite to the center of the earth. The sun fixed reference frame ($X_s$, $Y_s$, $Z_s$) is defined as follows: the $Y_s$-axis coincides with the orbit $Y_0$-axis; the projection of the sun vector on the orbit plane is at the $Z_s$-axis, and the $X_s$-axis completes a right-handed orthogonal triad. FIG. 2 also gives the coordinate transformation between these two coordinate systems where roll ($\phi$) and yaw ($\psi$) angles are defined as the rotation angles about the $X_0$-axis and $Z_0$-axis, respectively; U is the rotation angle about the $X_s$-axis, and V is about the $Z_s$-axis. The two coordinate systems coincide at local midnight. The orbit coordinate frame rotates about the sun frame, $Y_s$-axis, with orbit rate of $\omega_0$. For Intelsat VI the nutation damping time constant is much shorter than the geostationary orbit period; hence, it can be justified that the nutational dynamics can be neglected in the spacecraft dynamical model for SAC analysis.

Figures 3, 4:
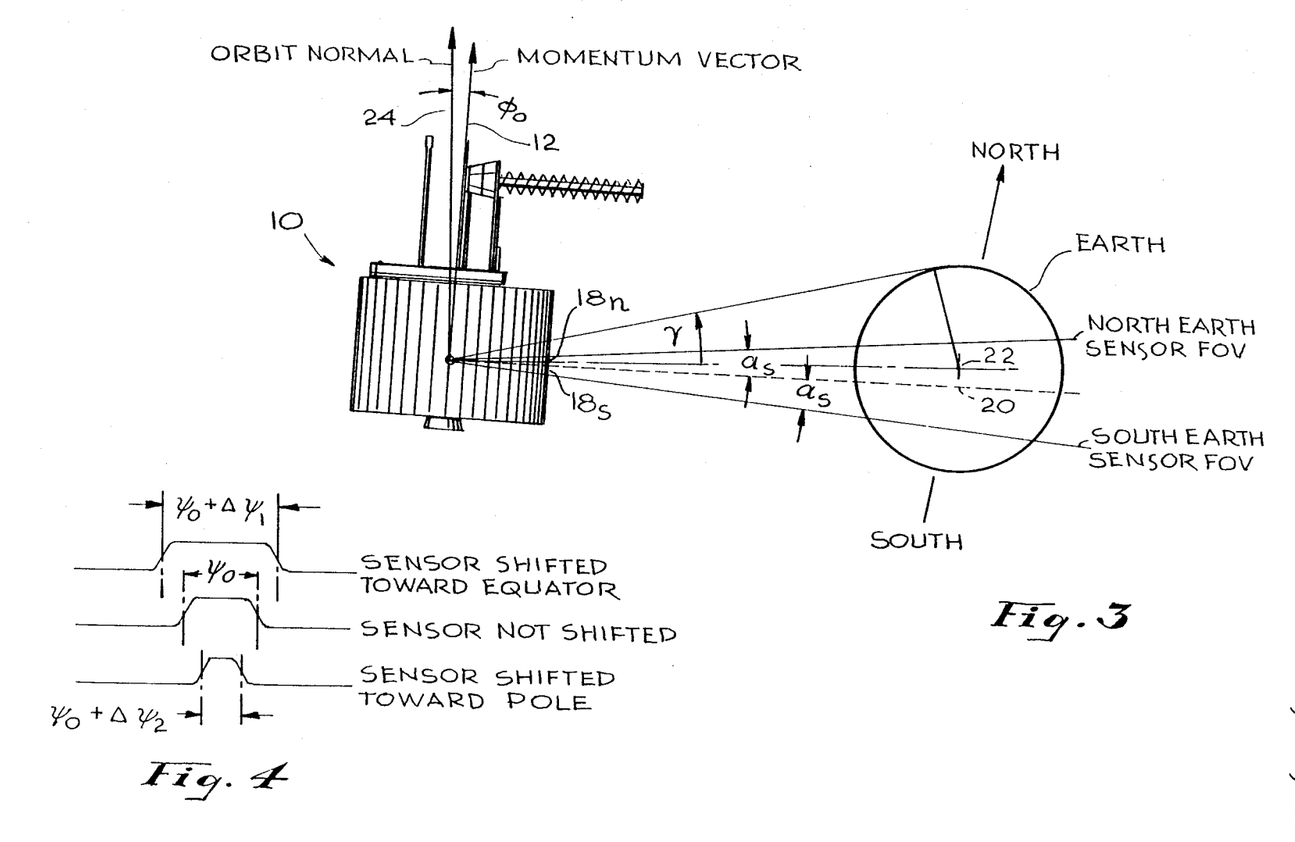
FIG. 3 is a schematic representation of a satellite illustrating the operation of the earth sensors.
FIG. 4 is a sketch of earth sensor output waveforms.

FIG. 3 is a diagram illustrating the way in which the orientation of the spin axis of the satellite 10 is determined from a scan of the earth as the satellite rotates. The satellite is provided with a pair of earth sensors (see FIG. 6) which are arranged to view the earth through a window, $18_n$ or $18_s$, each time the windows face the earth. The spin plane of the satellite 10, indicated by the broken line 20, should coincide with the orbital plane which passes through the center of the earth 22. When properly oriented, the spin axis 12 will coincide with the orbit normal arrow 24. The north earth sensor field of view through the window $18_n$ extends by an angle $\alpha_s$ above the line 20. Similarly, the field of view of the south earth sensor through window $18_s$ extends by an angle $\alpha_s$ below the broken line 20. If the spin plane deviates from an intersection with the center of the earth 22, one of the sensors will view the earth for a longer interval than if no deviation exists and the other sensor will view the earth for a shorter interval. This is because the field of view of one sensor is closer to the equator than that of the other sensor, which is then closer to one of the poles. In the drawing of FIG. 3, in which the spin plane 20 is shown shifted in a southerly direction from the center of the earth 22, the north earth sensor scans a longer earth chord and the south earth sensor scans a shorter earth chord. FIG. 4 shows the variation of the sensed chord length for different attitude conditions. $\psi_0$ which corresponds to zero shift of the spin plane should equal a reference value $Z_{ref}$ which is stored in the processor memory. The measured deviation of sensed chord length from the reference value is a measure of the earth aspect angle which is used in determining the extent to which the spin plane, or the spin axis, deviates from the correct attitude.

In synchronous orbit the external disturbances on the spacecraft are dominated by the solar radiation pressure. The solar torque can be predicted and expressed in terms of a Fourier series. With the secular term in the solar torque Fourier expression and the spacecraft angular momentum, the spacecraft precession rate due to solar torque can be modeled as $\dot{U} = 0$
$\dot{V} = A_o$ The linearized kinematic rotation equation of the spacecraft in roll ($\phi$) and yaw ($\psi$) in synchronous orbit are $\dot{\phi} = \omega_o \psi + A_o \sin \omega_o t + \omega_1$
$\dot{\psi} = -\omega_o \phi + A_o \cos \omega_o t + \omega_2$ where $W_1$ and $W_2$ are white Gaussian noises representing primarily the neglected higher order terms in the solar torque Fourier expression.

The earth sensor bias variation has been modeled as a random walk with input noise sufficient to cause its $1\sigma$ value to grow at a certain rate. Although the mean square value of a random walk process grows linearly with time and only seems to be suitable for short term operation, it can be justified because the control loop time constant (in the order of 1 hour) is much shorter than the characteristic time of the random walk process.

For the analysis and computer simulation to be followed, the noise inputs $w_1$, $w_2$ can be modeled as $$w_i = \frac{1}{\sqrt{T_s T_o}} * \sigma_i * N(0,1)$$

where
$T_s$ = sampling period which represents the computer simulation time interval
$T_o$ = random walk characteristic time
$\sigma_i$ = one sigma or expected value of the noise after time $T_o$
$N(0,1)$ = Gaussian random noise generator with zero mean and $\sigma = 1$ The spinning earth horizon sensor measures the earth chord length (Z) which can be related to the spacecraft roll angle, $\phi$, by the following approximation (FIG. 3):

$$Z \cong \left( \frac{2 \sin \alpha_s}{\sqrt{\cos^2 \alpha_s - \cos^2 \gamma}} \right) \phi = \frac{1}{K} \phi$$

where $\gamma$ = the earth angular radius, $\alpha_s$ = sensor cant angle, $\phi$ = the spacecraft roll angle measured from the orbit normal, and Z is the sensor output. The roll attitude measurement $Z_n$ can be obtained at iteration period n from the following equation:

$Z_n = K(Z_{avg} - Z_{ref}) + Z_b - \alpha \cos(2\gamma_n) - \beta \sin(2\gamma_n) + \omega_z$ where $Z_{avg}$ = average chord length
$Z_{ref}$ = referenced chord length, a fixed number
$Z_b$ = commandable bias, for transient free sensor switching
$\alpha, \beta$ = commandable parameters to compensate for sensor cyclic bias
$\gamma_N$ = orbital angle at iteration period N
$\omega_z$ = sensor noise can be modeled as Gaussian white noise with zero mean and with standard deviation of $\sigma_z$ The sensor noise will be averaged out after M measurements taken in accordance with $$\omega_z = \frac{1}{\sqrt{M}} * \sigma_z * N(0,1)$$

There is no direct yaw angle measurement available with the spinning earth sensors; the yaw information can be obtained through the orbit kinematic coupling as described below.

Figure 5A:
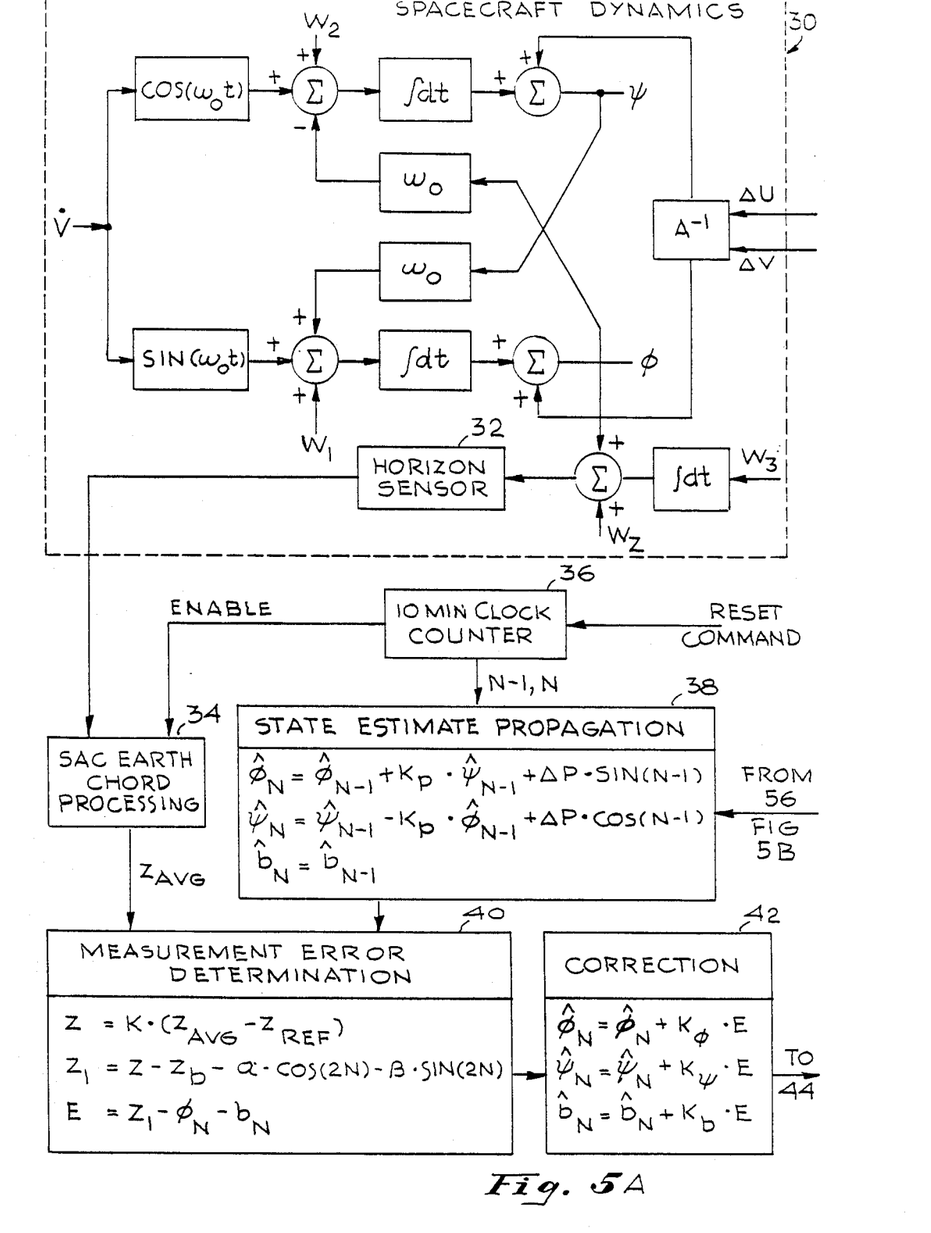
FIGS. 5A and 5B are functional block diagrams of the spin axis controller (SAC) of the present invention.
Figure 5B:
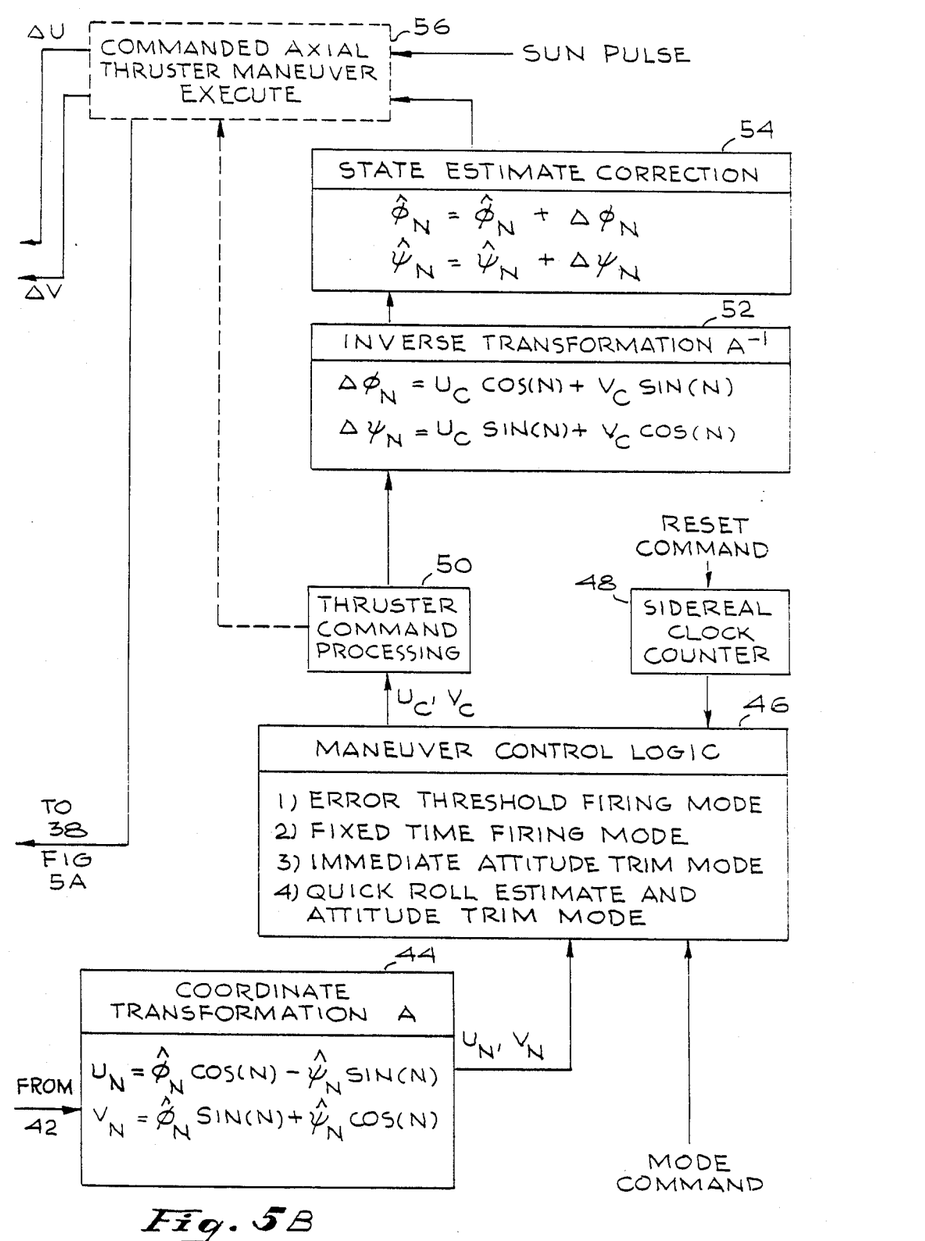
Figure 6:
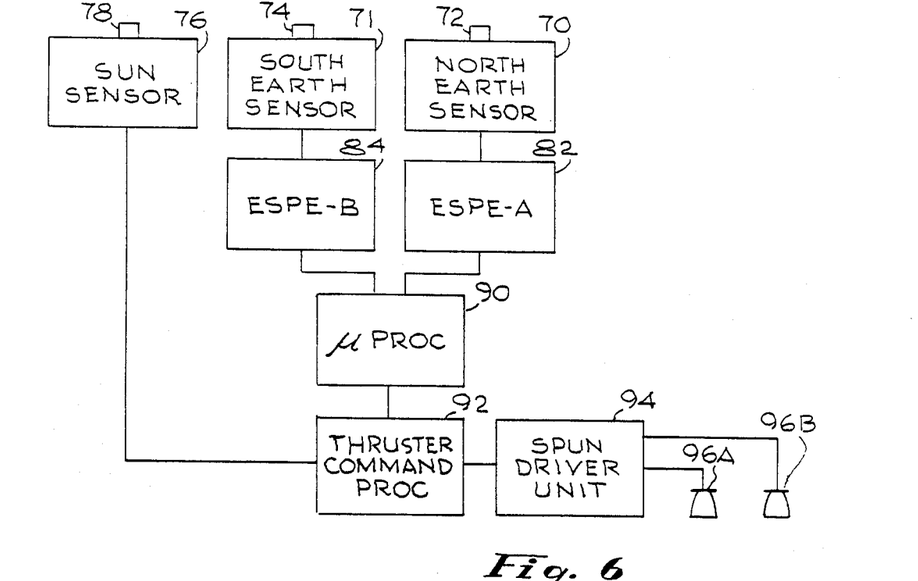
FIG. 6 is a simplified schematic block diagram representing the spin axis controller.

The spacecraft control system and the particular portion thereof relating to the spin axis attitude controller of the present invention are represented in the functional and schematic block diagrams of FIGS. 5A, 5B and 6.

In the functional block diagram of FIGS. 5A and 5B, a simple model of the spacecraft dynamics, represented within the block 30, is shown where the forcing function of the system is the angular drift rate about the sunline ($\dot{V}$). The block 30 is shown containing the horizon sensor 32 which is coupled to provide an input to an earth chord processor 34, connected to be enabled by a counter 36. The counter 36 also controls a state estimate stage 38 which, with the earth chord processor 34, provides an output to a measurement error determination stage 40. The result is a correction of the state estimates, developed in correction stage 42 and applied to a coordinate transformation stage 44. The output of the stage 44 is applied to a maneuver control logic stage 46, controlled by a sidereal clock counter 48 and providing an output to a thruster command processor 50. The processor 50 is followed by an inverse transformation stage 52 and an estimate correction stage 54 which provides an output to a thruster driver 56.

In the schematic block diagram of FIG. 6, the system is represented as comprising north and south earth sensors 70, 71 having separate field-of-view sensing elements 72, 74 and a sun sensor 76 having a sensing element 78. The earth sensor 70 provides an output to a first earth chord processor 82 comprising the earth sensor processing electronics (ESPE-A). A second earth chord processor 84 containing the earth sensor processing electronics (ESPE-B) is connected to the south earth sensor 71 for alternative earth chord sensing. There is also a sun sensor 76 with element 78 to provide a pulse for controlling the spin phase angle for thruster firing. The outputs of the blocks 82, 84 are applied to a microprocessor 90 which contains the spin axis controller algorithm corresponding to the functional diagram of FIG. 5. The output of the microprocessor 90 is coupled to a thruster command processor 92 which in turn is coupled to a spun driver unit 94, connected to control the axial thrusters 96A, 96B.

Referring to the functional block diagram of FIGS. 5A and 5B, the state estimate propagation algorithm is executed every 10 minutes (corresponding to 2.5° of orbital motion). This calculation uses the previous estimates along with the specified drift rate to predict the present value of the states. The earth chord processor nominally uses 256 consecutive earth chord measurements to determine a low noise average chord width ($Z_{avg}$) which is then used in conjunction with the state predictions to determine a prediction error. This prediction error is multiplied by the estimator gains ($K_\phi$, $K_{104}$, $K_b$) and added to the respective predictions to determine the new state estimates. A coordinate transformation of these state estimates from the body fixed frame ($\hat{\phi}$, $\hat{\psi}$) to the sun fixed frame (U, V) is then performed before the maneuver logic is evaluated. The transformation of the state estimates to the sun fixed coordinates is to permit the use of constant axial thruster firing angles when performing spin axis attitude correction maneuvers. This eliminates the need for complex real time firing angle calculations, thus vastly simplifying the control procedures and processor demands.

If attitude corrections are necessary, the magnitudes of the desired corrections is the sun fixed frame ($U_c$, $V_c$) are sent to the thruster command processor, and the appropriate axial thruster commands are executed if the SAC is enabled and no other thruster firings are in progress. The spin phase angle of the firings is controlled by a sun sensor pulse. Meanwhile, the corresponding corrections to the estimates of roll and yaw ($\hat{\phi}$, $\hat{\psi}$) are made and the results fed back to the state estimate propagation algorithm for use in the next cycle. The attached Appendix I lists the SAC commandable parameters. The ACP algorithm scaling is given in Appendix II.

The SAC features two primary modes of operation (ETF, FTF), along with two special purpose executable sequences (IAT, QAT), which temporarily override the primary operating mode.

The Error Threshold Firing Mode (ETF) is the simpler of the two operating modes. Attitude corrections are made whenever a ground commandable threshold is exceeded. The threshold logic monitors the two attitude estimates in the sun fixed frame ($\hat{U}$, $\hat{V}$). When either of these estimates exceeds its threshold ($\hat{U}_o$ or $V_o$), a command to null the attitude in that particular direction is executed. For example, when $\hat{V} \geq V_o$, a V correction of $-V_o$ is performed. The thruster impulse is calibrated in orbit so that an integral number of thruster pulses will nominally result in the desired correction, $-V_o$. This granularity equals the attitude correction resulting from a single thruster pulse and is a ground commandable parameter which is matched to actual thruster performance.

ETF mode corrections can occur at any 2.5° point in the orbit. The only restrictions that prohibit corrections are the general restrictions for all SAC commanded corrections, such as SAC corrections will not be executed while other maneuvers are in progress or while the spacecraft is within an eclipse window (when the sun is not visible).

Figure 7:
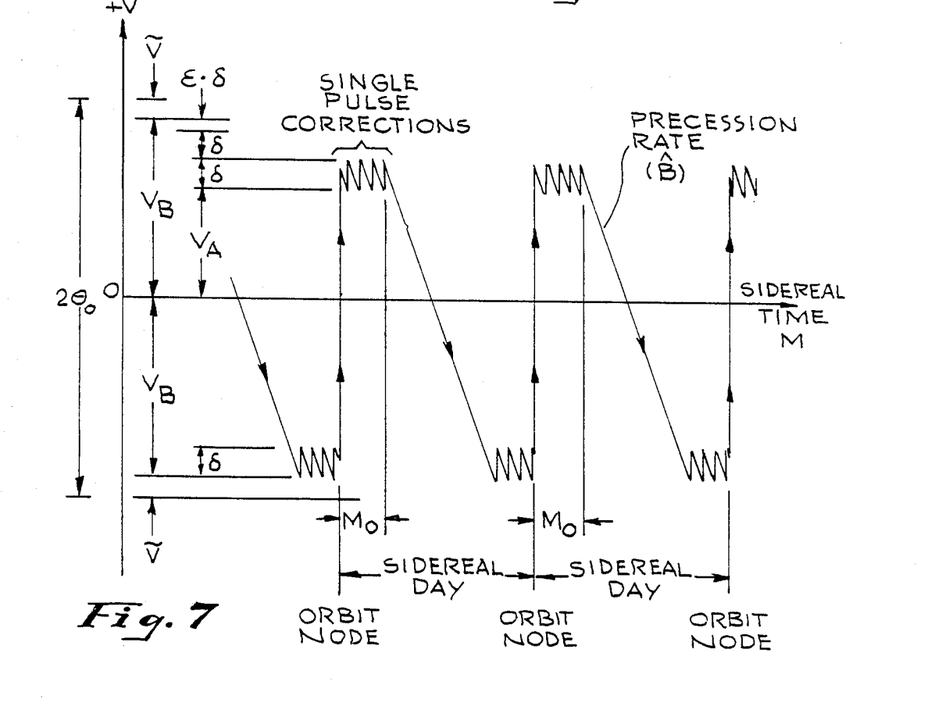
FIG. 7 is a plot illustrating spin axis correction of a satellite controlled in accordance with the present invention.
Figure 8A:
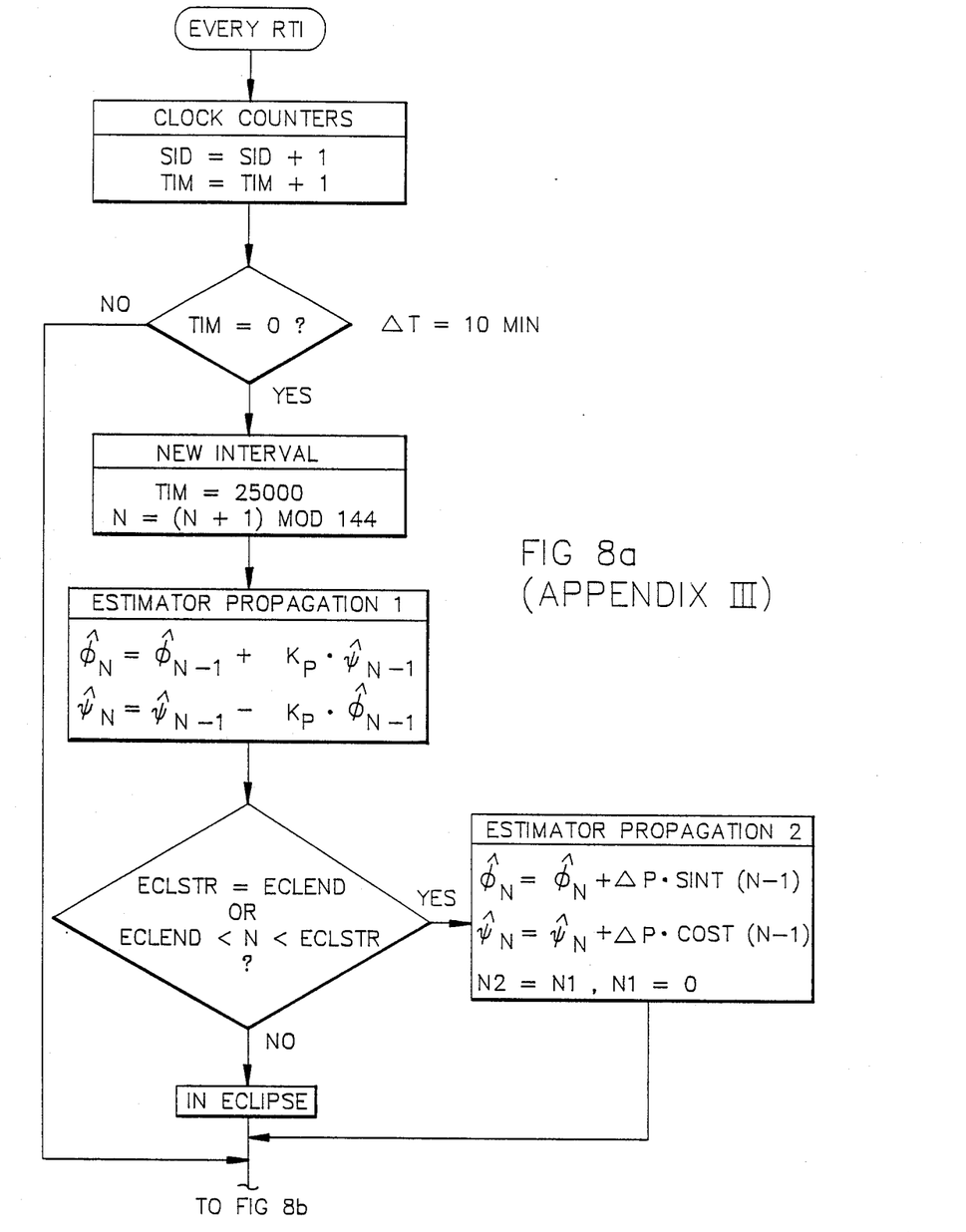
FIGS. 8a through 8h are Appendix III which is the Spin Axis Controller logic diagram.
Figure 8B:
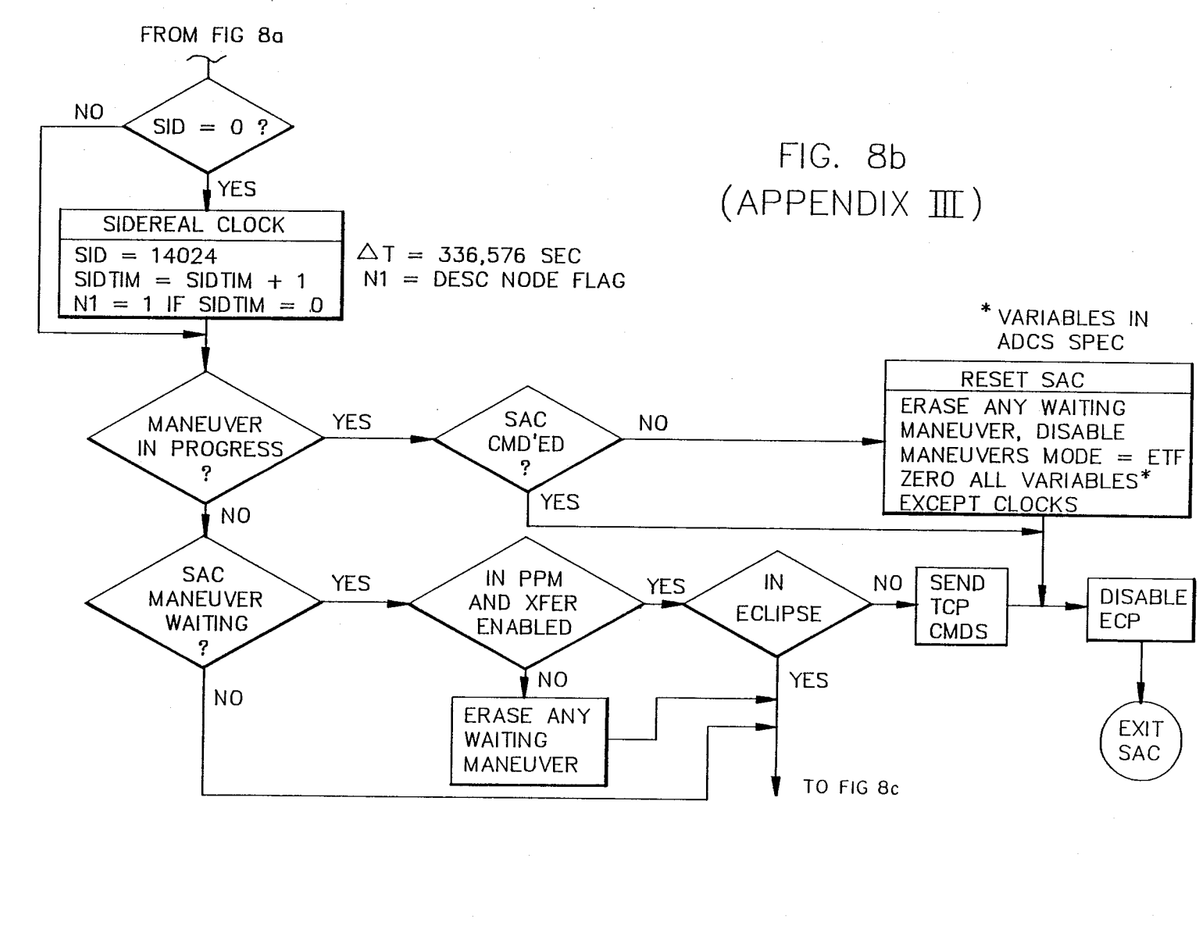
Figure 8C:
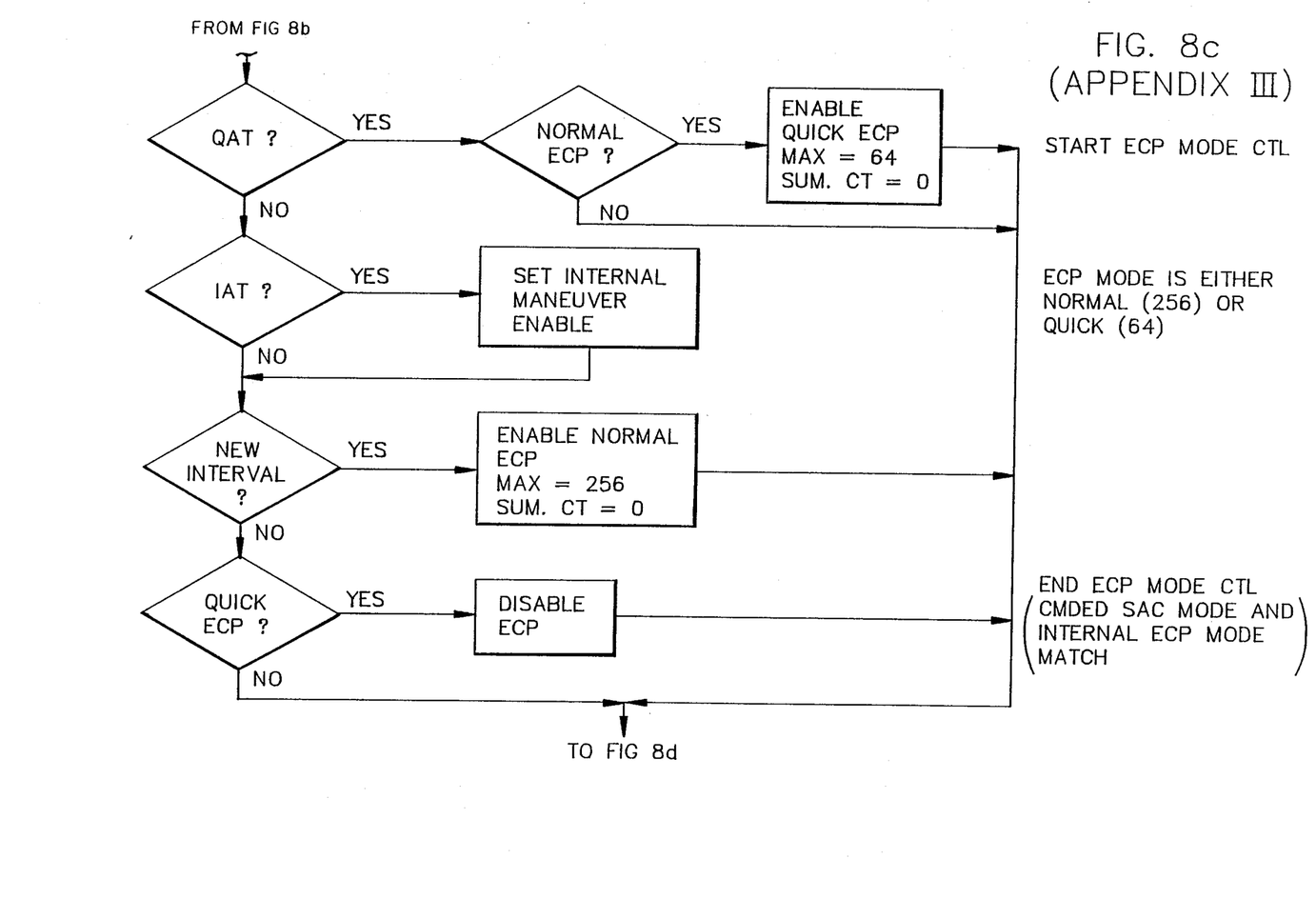
Figure 8D:
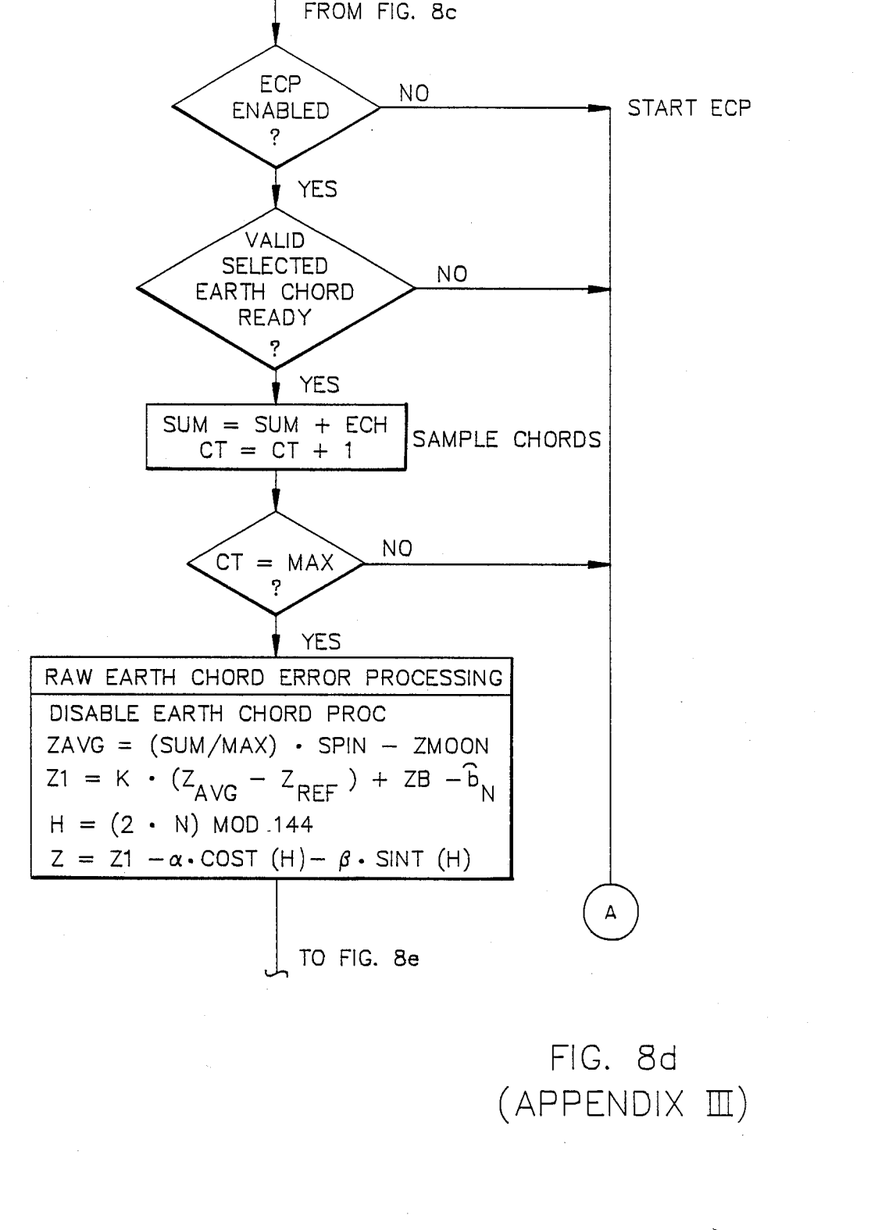
Figure 8E:
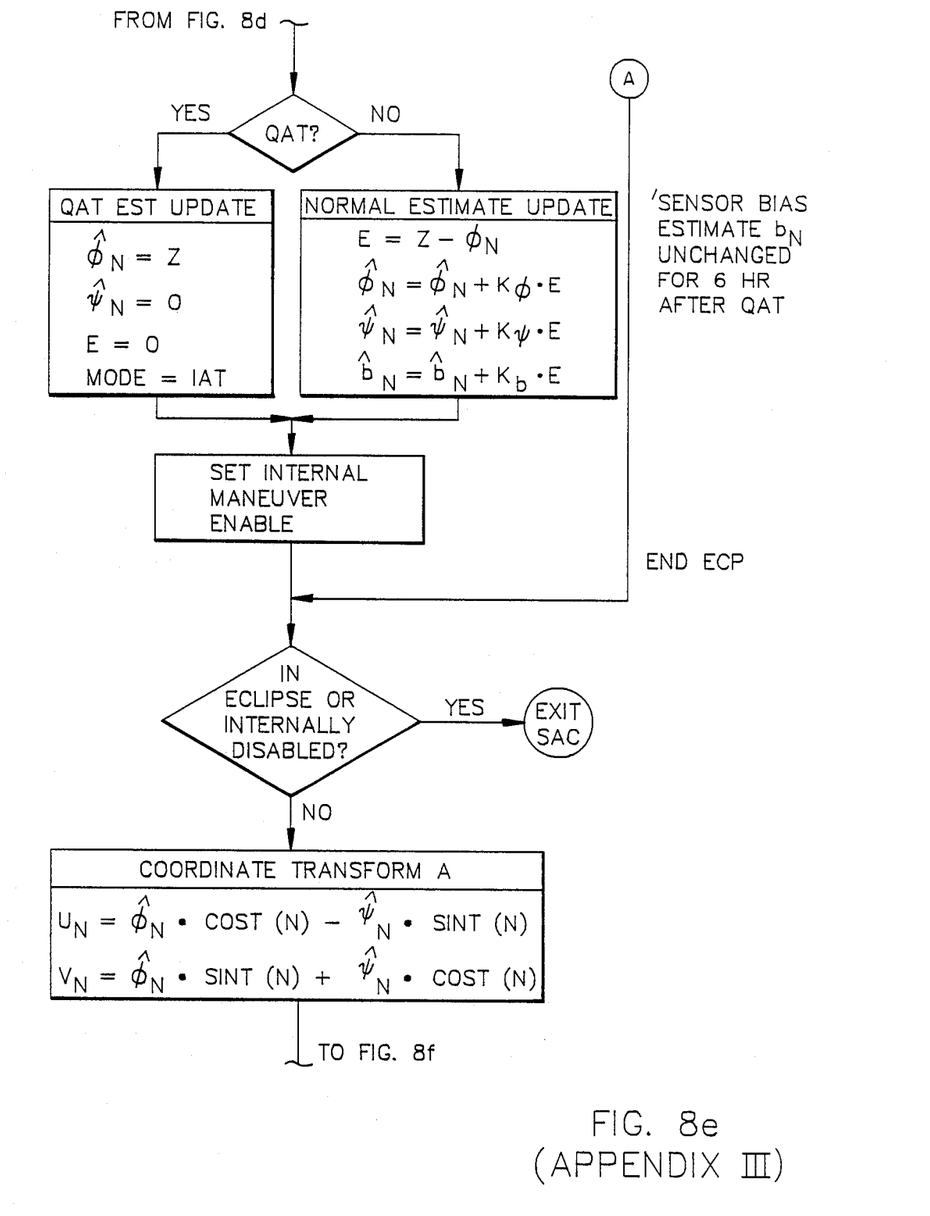
Figure 8F:
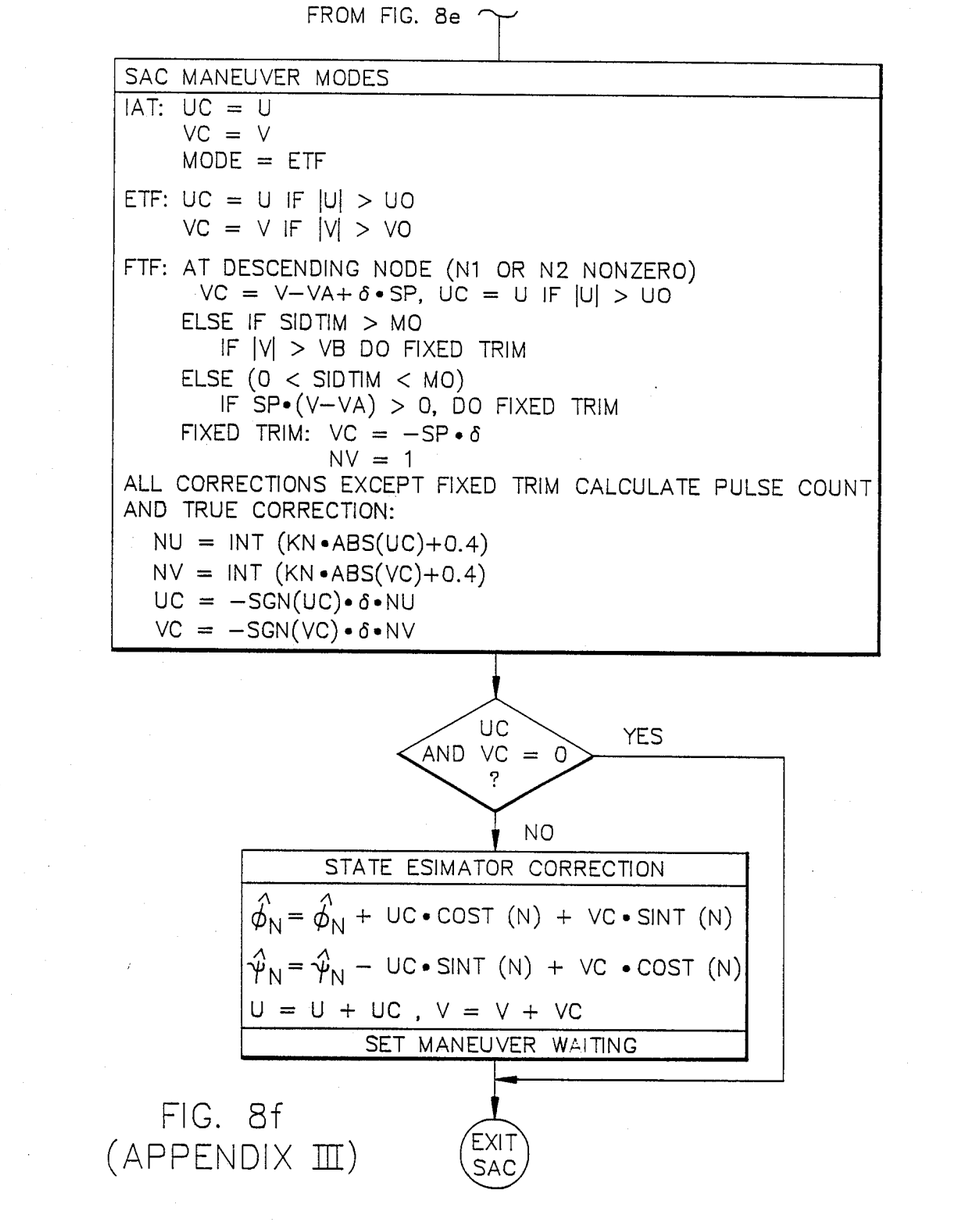
Figure 8G:
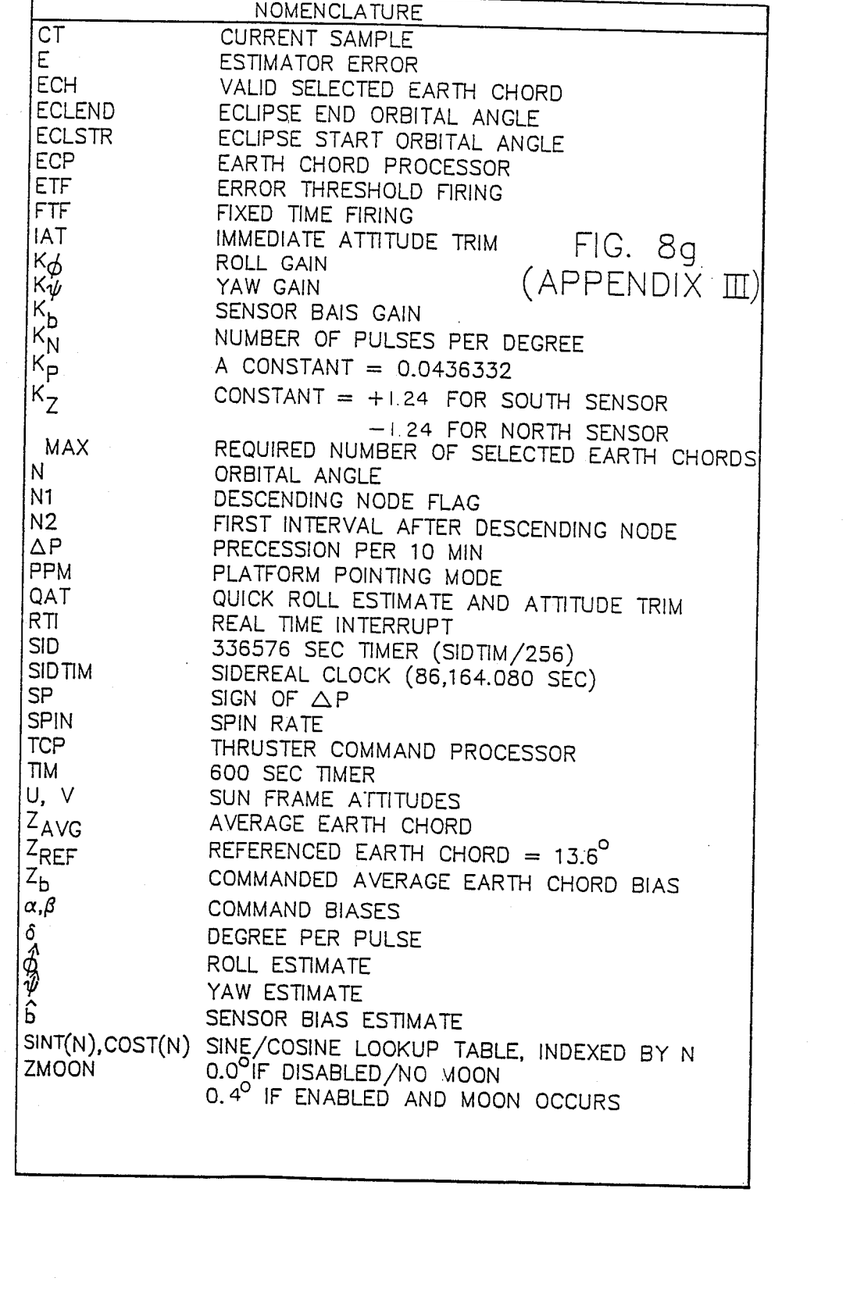
Figure 8H:
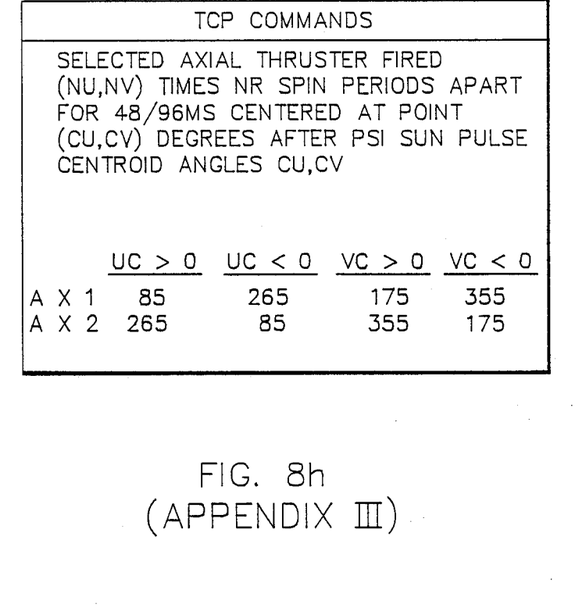

The Fixed Time Firing Mode (FTF) involves a more complex logic which determines corrections according to both error magnitude and the spacecraft orbit location. Its objective is to restrict corrections to occur near the orbit node for the most efficient use of fuel. By making attitude corrections near the node, the small spacecraft velocity change which occurs will assist in north-south stationkeeping. FIG. 7 shows an example time history of the estimated spacecraft precession normal to the sunline during FTF mode operation. The attitude correction's attempt to maintain the precession within a ground specified band can be seen. Major corrections occur once a day at the node. For large precession rates where one correction per day is not sufficient, additional logic keeps the estimate within the band by a series of minor corrections made near the node in addition to the major correction at the node.

The appropriate thresholds and timing are described as follows. If $\pm\theta_o$ is allocated to be the spin axis attitude error budget, the delta angle ($\delta$) per axial thruster pulse and the estimator error ($\tilde{V}$) are known. Then, the after node threshold ($V_a$) and the before node threshold ($V_b$) can be computed $$V_b = abs(\theta_o - \tilde{V})$$

$$V_a = \text{sign}(\hat{B})(V_b - 2\delta - \epsilon_f^* \delta)$$

where

B = estimated precession rate and
$\epsilon_f$ = antenna flexure due to flexible motion coupling with nutation motion (constant value)

An extra $\delta$ angle was taken into account in computing $V_a$ since a step of $\delta$ attitude correction in the angular momentum vector will induce a $2\delta$ transient motion in spacecraft spin axis attitude. The parameter $M_o$ designates the sidereal clock timing at which the FTF logic switches thresholds. The time parameter for switching is defined as the time from the orbit node in hours $$M_o = 12\left(1 - \frac{2V_b - \delta - \epsilon_f^* \delta}{V_{avg}}\right)$$

The use of $M_o$ in the firing logic is to ensure that all attitude corrections occur as near and symmetric to the orbit node as possible. Thus, the FTF mode control logic (FIG. 7) can be summarized:

U maneuver $$\Delta U \text{ if } \hat{U} > |\hat{U}|_o \text{ at } M = 0 \text{ (orbit node)}$$

else $$\Delta \hat{U}_c = 0$$

V maneuver $$\Delta V_c = \delta_p \text{ if } SP^*\hat{V} \geq SP^*V_a \text{ and } M_o \geq M > 0 \text{ or }$$
$$|\hat{V}| \geq \hat{V}_b \text{ and } M > M_o$$

else $$\Delta V_c = \hat{V} - V_a + \delta_p \text{ at } M = 0 \text{ (orbit node)}$$

or $$\Delta V_c = 0$$

where $$SP = \text{sign}(\dot{V}_{avg})$$

$$\delta_p = SP^*\delta$$

The percentage or the effectiveness ($\epsilon_f$) of the SAC FTF mode attitude correction fuel consumption, which is also applicable to the north-south velocity change maneuver, is equal to cosine ($\omega_o t_o$) where $\omega_o$ is the orbital rate and $t_o$ is the time from the orbit node crossing (i.e., $\omega_o t_o$ is orbital angle from the node). For an attitude trim occurring at $t_o = 0$ hour (orbit node), $\epsilon = 100$ percent, and at $t_o = 6$ hours (antinode), $\epsilon = 0$ percent. If an attitude trim occurs at $t_o$ greater than 6 hours, the fuel saving effectiveness becomes negative. Therefore, a SAC FTF mode attitude correction pulse firing at an orbital angle more than 90° away fro the orbit node will cause the SAC fuel consumption to contribute to the north-south $\Delta V$ maneuver in a negative sense. Thus, it is desirable to design the FTF mode control logic such that $t_o$ is $\pm 6$ hours from the orbit node crossing time.

Two ground commanded control modes, Immediate Attitude Trim (IAT) and Quick Roll Estimate and Attitude Trim (QAT), are incorporated to null the spin axis attitude prior to the stationkeeping maneuvers. In IAT mode the SAC processor uses the latest onboard estimates to execute an immediate attitude trim where $U_c = \hat{U}$ and $V_c = \hat{V}$. In QAT mode the SAC initiates a quick roll attitude estimate using the average of 64 chord length measurements, rather than the normal 256 measurements in the ETF or FTF modes, and the sun frame components of the attitude error estimates are computed with Yaw ($\hat{\psi}$) equal to zero. Then, an immediate trim maneuver is executed in the same fashion as in IAT mode. The estimate of bias is not updated until 6 hours after QAT has occurred to eliminate the transient response. Several modes of SAC operation are commandable. In addition, the sidereal time, orbital angle, and state estimates may all be reset by ground command and nearly all the parameters discussed are programmable.

The SAC mode command allows the ground to select ETF, FTF, QAT, or IAT operation of the SAC. The command is coded so that these mode commands are mutually exclusive. The default power-on operational mode is ETF. This mode of operation is also commanded by the processor at the completion of an IAT or QAT maneuver. The Spin Axis Controller logic diagram is attached hereto as Appendix III.

An important function of the SAC mode command is the enable/disable of attitude corrections. If this bit is not set (i.e., attitude corrections are disabled), the estimators will continue to run, maneuver commands will be generated, but no thruster commands will be sent, and no thrusters will actually fire. The accumulated thruster pulse counts, SUMU and SUMV, are not changed if attitude corrections are disabled. To command thruster firings, the enable bit must be set and the platform despin controller (PDC) must be in platform pointing mode.

Other bits in the SAC mode command control the selected input to the earth chord processor (ESPE-A or ESPE-B), the default or alternate gain selection for the estimators, the selection of the SAC spin rate to be a ground command constant or the auxiliary rate estimate from the PDC, the pulse width of commanded thruster maneuver (48 or 96 ms), and the selection of axial thruster (96A or 96B) to be used for attitude corrections. Default power-on conditions are: ESPE-A for earth chord processing, default estimator gains, SAC spin rate equal to a constant (30 rpm), and a 96 ms pulse width with a zero thruster selection. Selection of thruster 96A or 96B is not mutually exclusive. If a zero thruster selection is sent, 96A will be used. If both thrusters are selected by ground command, 96B will be used.

The variable reset command will reset the SAC estimates of roll, yaw, and bias to zero upon receipt of the command.

A counter (36) which times out every 10 minutes is incremented each real time interrupt (RTI) of the processor. At time-out, the orbital angle, $\gamma$, is incremented by 2.5°, the estimate propagation occurs, and the earth chord processor 34 is reset if no maneuvers are currently in progress. The orbital angle, $\gamma$, is used in the coordinate transformation of roll and yaw to sun fixed coordinates. It may be set by ground command to any value between 0° and 360° with a resolution of 2.5°. When a new value of $\gamma$ is set by ground command, the 10 minute timer 36 and the earth chord processor 34 are reset. All other SAC variables remain unchanged. It is possible to send a value of greater than 360° given the format of the serial command. The processor will use a value for $\gamma$ which is the ground commanded value modulo 360°.

A second counter 48 which times out every 5.61 minutes is also incremented each RTI of the processor. At time-out, the sidereal time (M) is incremented by its least significant bit (336.648 seconds), and the 5.61 minute counter is reset. The sidereal timer 48 continues to be incremented each 5.61 minutes until full scale is reached (23.94 hours) representing one sidereal day. It then sets the orbit node flag and begins to count again from zero. It may be set by ground command to any value between 0 and 23.94 hours. Upon receipt of such a command, the sidereal time will be set appropriately, and the 5.61 minute counter will be reset to zero. All other SAC variables remain unchanged.

A more detailed exposition of the equations shown in the blocks 38, 40 and 42 of FIG. 5A is set forth as follows. As indicated in FIG. 5A, the three state estimator 38, using earth sensor roll axis measurements, provides the state estimates for thruster control logic design. The three estimated states are roll angle ($\phi$), yaw angle ($\psi$), and sensor bias (b). Other variables (e.g., the parameter $A_o$ in the precession rate model), which slowly vary compared to $\phi$, $\psi$, or b, are treated as constants and may be updated periodically via ground command. The state estimator has the following simplified two state structure.

---

Prediction
$\bar{\phi}_N = \hat{\phi}_{N-1} + \omega_o t \hat{\psi}_{N-1} + \hat{A}_o t \sin \omega_o (N-1) t$
$\bar{\psi}_N = \hat{\psi}_{N-1} + \omega_o t \hat{\phi}_{N-1} + \hat{A}_o t \cos \omega_o (N-1) t$
$\bar{b}_N = \hat{b}_{N-1}$ Correction
$\hat{\phi}_N = \bar{\phi}_N + K_\phi (Z_N - \bar{\phi}_N - \bar{b}_N) + \Delta \hat{\phi}_N$
$\hat{\psi}_N = \bar{\psi}_N + K_\psi (Z_N - \bar{\phi}_N - \bar{b}_N) + \Delta \hat{\psi}_N$
$\hat{b}_N = \bar{b}_N + K_b (Z_N - \bar{\phi}_N - \bar{b}_N)$ where

| | | |
|---|---|---|
| t | = | estimator update time |
| $\bar{\phi}_N, \bar{\psi}_N,$ and $\bar{b}_N$ | = | predicted values of $\phi$, $\psi$, and b at sample N |
| $\hat{\phi}_N, \hat{\psi}_N,$ and $\hat{b}_N$ | = | updated values of $\phi$, $\psi$, and b at sample N |
| $K_\phi, K_\psi$ and $K_b$ | = | estimator gains in $\phi$, $\psi$, and b respectively |
| $Z_N - \bar{\phi}_N - \bar{b}_N$ | = | measurement error at sample N |
| $\Delta \hat{\phi}_N$ and $\Delta \hat{\psi}_N$ | = | control inputs in delta angles resulting from axial thruster firing |

---

This set of simplified estimator equations is applicable when the estimator update time (t) is much shorter than the orbital period of 24 hours.

The optimal estimator gains, $K_\phi(N)$, $K_{104}(N)$, and $K_b(N)$, can be determined by solving a Riccati equation. But the gains determined are time varying which is difficult to implement in a microprocessor with limited memory size. Thus, it is preferable to seek a set of constant estimator gains that provide sufficient speed of estimator error reduction and at the same time keep the estimator steady state error within acceptable bound. Such a constant estimator gain matrix can be readily developed by methods known in the art.

These may be selected to provide better spin axis attitude pointing in the steady state or by techniques which are more suitable for transient state operation, depending upon the choice of the user. With the use of digital simulation, it is possible to derive a set of constant estimator gains which may exhibit better spin axis pointing for the steady state operation and still provide sufficient speed for the estimator error reduction.

The spin axis controller of the present invention is effective in controlling the trim maneuvers which are needed to maintain the spin axis of the spacecraft within acceptable limits of a preferred position. The spin axis controller accurately detects minor deviations of axis attitude from the orbit normal by measuring the difference between an earth chord observation from a selected earth sensor and a reference value. The resulting measurement information is processed in accordance with the controller algorithm, including transformation of coordinate data to a sun fixed reference system, and is then utilized to control the firing of a selected axial thruster to correct the detected deviation. The timing of the firing of the thruster is selected to correspond with the rotational position and the orbital position of the satellite so that the firing of the selected thruster will act to both correct the spin axis attitude and adjust the orbital plane, if necessary, thereby economizing on the fuel needed to maintain the spacecraft in the proper attitude. To take care of possible contingencies, the spin axis controller is provided with a plurality of modes of operation. For larger precession errors which are in excess of a preset threshold level, the thruster can be commanded to fire in an error threshold firing mode so that the spin axis is drawn back within the threshold range. For more efficient overall fuel usage, the fixed time firing mode serves to restrict firings to occur near the orbital node crossing, such that the velocity impulses imparted by attitude corrections contribute favorably to the orbit inclination, i.e. north-south stationkeeping. Also, for minimizing the spin axis attitude errors prior to stationkeeping maneuvers, the spin axis controller includes two automatic sequences for nulling estimated attitude error: an immediate attitude trim mode in which the controller uses the latest onboard attitude estimate to execute an immediate attitude trim, and a quick roll estimate and attitude trim mode in which a quick roll estimate is utilized, followed by an immediate attitude trim maneuver. Either of the automatic sequences can be executed from either onboard stored command or by direct ground command. These respective modes of operation of the spin axis controller are effective in assuring that the spacecraft can be controlled by the spin axis controller under the various operating conditions which may be encountered.

Although there have been described above specific arrangements of an autonomous spin axis attitude controller in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be

APPENDIX I

COMMANDABLE PARAMETERS

| Parameter | Definition | Commandable Range | Resolution | Default or Initial Value |
|---|---|---|---|---|
| SPIN | Spin rate, deg/sec | 150 to 270 | 0.0286 | 180.00 |
| $Z_B$ | Chord length bias, deg | 0 to 360 | 0.00549 | 0 |
| $\alpha, \beta$ | Sensor cyclic bias, deg | ±0.703125 | 0.00002145 | 0 |
| $\Delta P$ | Secular precession (per 10 min interval), deg | ±0.0027460 | 0.00002145 | 0 |
| $K_\phi$ | Estimator gain, roll | +1.0 | 1/256 | 0.5 |
| $K_\psi$ | Estimator gain, yaw | +2.0 | 1/128 | 0.5 |
| $K_b$ | Estimator gain, sensor bias | +1.0 | 1/256 | 0.148 |
| $U_o, V_o$ | Firing thresholds (ETF), deg | +.00549° to +0.35156 | 0.00002145 | 0.703 |
| $V_b$ | Firing threshold (FTF), deg | +.00549° to +0.35156 | 0.00002145 | 0.703 |
| PW | Thruster pulse width, ms | 48 or 96 | — | — |
| $\delta$ | Degree per pulse, deg | +0.004° to +0.087890 | 0.00002145 | 0.02 |
| $N_R$ | Spin revolutions between successive pulses | 255 | 1 | 15 |
| $\gamma_o$ | Reset value of $\gamma$ (orbit angle), deg | 360 | 2.50 | 0 |
| M | Reset value of sidereal clock, sec | 86,181,888 | 336,648 | 0 |
| $M_o$ | FTF threshold switching, SAC | 43,090,944 | 336,648 | 43,090,944 |
| $\gamma_{ECLSTR}$ | Eclipse start orbit angle, deg | 0 to 360 | 2.50 | 0 |
| $\gamma_{ECLEND}$ | Eclipse stop orbit angle, deg | 0 to 360 | 2.50 | 0 |

APPENDIX II

ALGORITHM VARIABLE SCALING

| Variable | Range | Resolution | Bits |
|---|---|---|---|
| Earth chord data ($Z, Z_{avg}$), deg | 0 to 18 | 0.00002145 | 24 |
| State estimates ($\hat{\phi}, \hat{\psi}, \hat{b}, \hat{U}, \hat{V}$), Measurements residual (e), deg | ±0.703125 | 0.00002145 | 16 |
| Orbit angle, deg | 0 to 360 | 2.5 | 8 |
| Sidereal clock, sec | 86,181,888 | 336,648 | 8 |

What is claimed is:

1. A method for controlling the spin axis attitude and orbit inclination of a spinning spacecraft in a geosynchronous orbit comprising the steps of:
   sensing the direction of the earth from the spacecraft to detect deviations of the spacecraft spin plane from coincidence with the spacecraft orbital plane and developing signals in accordance with the detected deviation;
   generating signals for controlling the activation of spacecraft thrusters in response to said detected deviation signals; and
   selectively applying the thruster control signals to activate a selected thruster when the spacecraft is in the vicinity of a descending orbit node and at a predetermined point on the rotation of the spacecraft to develop an element of orbit plane adjustment and a correction of the deviation of the spin axis.

2. The method of claim 1 and further including the step of performing a series of minor spin axis attitude error corrections symmetrically positioned about the descending orbit node to maintain the spin axis attitude error within a specified range and wherein the thruster activation in the vicinity of the descending orbit node is controlled to develop a major spin axis attitude correction in response to substantial spin axis attitude error measurements.

3. The method of claim 1 wherein the step of selectively applying the thruster control signals is performed a predetermined number of times on opposite sides of the orbit node.

4. A method for controlling the spin axis attitude and orbit plane inclination of a spinning spacecraft in a geosynchrous orbit comprising the steps of:
   sensing the direction of the earth from the spacecraft to detect deviations of the spacecraft spin plane from coincidence with the spacecraft orbital plane and developing signals in accordance with the detected deviation;
   generating signals for controlling the activation of spacecraft thrusters in response to the detected deviation signals;
   performing a plurality of minor spin axis attitude error corrections symmetrically positioned about the descending orbit node in response to the thruster control signals to maintain the spin axis attitude error within a specified threshold range; and
   applying the thruster control signals in the vicinity of the descending orbit node to develop a major spin axis attitude correction in response to substantial spin axis attitude error measurements.

* * * * *